Figure 1:
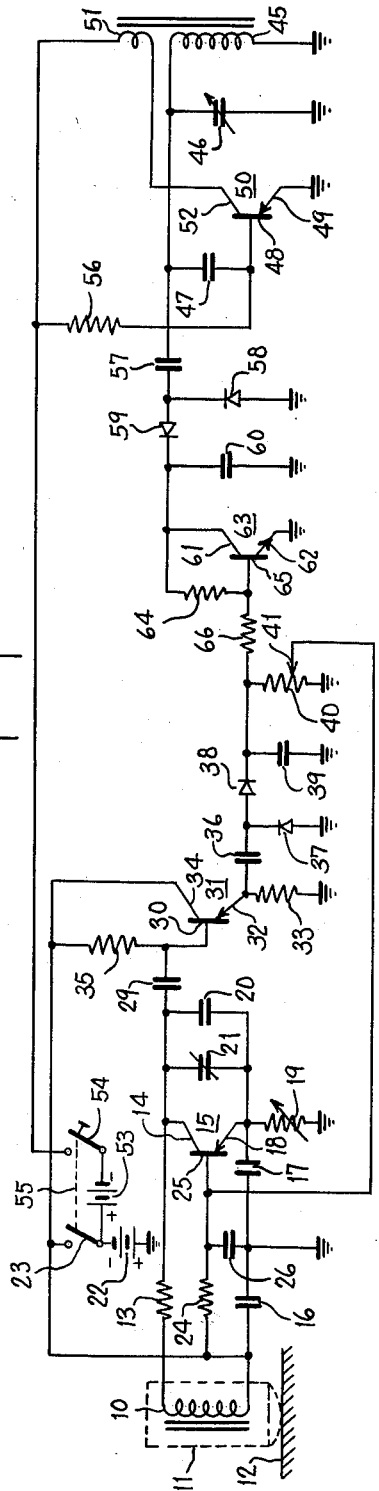

Feb. 16, 1965

W. C. HARMON 3,170,113

FLAW DETECTION DEVICE HAVING A MOVABLE PICK-UP
UNIT FOR DEVELOPING A FREQUENCY MODULATED
SIGNAL THAT IS TRANSMITTED TO A
STATIONARY INDICATING UNIT

Filed Nov. 10, 1959

2 Sheets-Sheet 1

INVENTOR.
WILLIAM C. HARMON
BY
W. H. Woodlief
ATTORNEY

INVENTOR.
WILLIAM C. HARMON
BY
W. H. Woodlief
ATTORNEY

United States Patent Office 3,170,113
Patented Feb. 16, 1965

3,170,113
FLAW DETECTION DEVICE HAVING A MOVABLE PICK-UP UNIT FOR DEVELOPING A FREQUENCY MODULATED SIGNAL THAT IS TRANSMITTED TO A STATIONARY INDICATING UNIT
William C. Harmon, Chagrin Falls, Ohio, assignor to Republic Steel Corporation, Cleveland, Ohio, a corporation of New Jersey
Filed Nov. 10, 1959, Ser. No. 852,005
10 Claims. (Cl. 324—37)

The present invention relates to indicators for detecting flaws in the vicinity of the surface of metallic bodies and, more particularly, to apparatus for the detection of superficial surface flaws such as seams, cracks and the like and for indicating the depth thereof to provide an indication of the general importance of each flaw detected.

The surface characteristics, especially as affected by oxidation or scale, of many metallic bodies such as steel billets, bars, pipe and the like are such as to make the detection of hairline seams and cracks difficult to detect by visual inspection since they are usually almost invisible to the naked eye. Furthermore, the detection of a surface defect often affords no indication of its depth and, therefore, the significance of the defect. The location and general significance of such surface defects may be accomplished by the use of relatively low frequency magnetic exploratory fields according to the method and apparatus disclosed in United States Patent Nos. 2,660,704 and 2,832,040. The arrangements therein shown and described utilize a search unit adapted to be positioned upon or adjacent to the surface of a metallic body to subject the body to a penetrating electromagnetic field generated by an inductor provided in the search unit, which is portable and connected through a cable for energization by an oscillator. Surface defects such as cracks and seams reduce the energizing power required by the search unit and thus produce transient changes of oscillator amplitude as the search unit is moved past the defect. These transient changes of oscillator amplitude are suitably amplified, detected and indicated to indicate the location and depth of each seam-like flaw.

Seam depth indicators of the type last described have been particularly successful in providing accurate and reliable indications of the location and depth of seam-like flaws in the vicinity of the surface of metallic bodies, but the interconnecting cable between the portable search unit and its relatively stationary energizing oscillator has been found to impose certain limitations on the manner with which flaw inspections may be carried out. For example, many automatic inspection applications require that the search unit have free and unrestricted movement over the surface of the metallic body inspected. The exterior surfaces of billets, bars and pipe may best be inspected by automatically moving the search unit in a continuous circular path around the body while concurrently moving either the body or the search unit longitudinally until the entire surface of the body is inspected. This inspection method is particularly desirable for the inspection of the inside surface of pipe. It will be evident that inspection in this manner is one wherein the inspection unit traces a helical path relative to the surface of the body inspected. Heretofore this method of inspection has been impractical due to the limitation imposed upon the movement of the search unit by the cable which interconnects the search unit with its relatively stationary energizing oscillator. While it might be thought that the use of a rotary joint or some form of slip ring structure might be used to permit rotary motion of the search unit relative to its non-rotating interconnecting cable, it has been found in practice that such rotating joints or slip rings are impractical due to variations of electrical resistance caused by the presence of dust or dirt or by natural or accelerated oxidation in the presence of fumes carrying moisture and oxidizing gases.

It is an object of the present invention to provide a new and improved seam depth indicator characterized by unusual ease and flexibility of operational application to the detection of seam-like flaws in the surface of metallic bodies.

It is an additional object of the invention to provide a seam depth indicator of unrestricted portability yet one possessing high operational reliability and accuracy in the indication of the location and depth of seam-like flaws, and one which may be calibrated in a simple and reliable manner with retention of its calibration accuracy over prolonged periods of operation.

It is a further object of the invention to provide a seam depth indicator of improved adaptability to both manual and automatic inspections and especially those which must be carried on in confined spaces or under other like difficult inspection conditions.

It is yet a further object of the invention to provide a novel seam depth indicator utilizing a small, compact, and light-weight inspection unit which is self-contained as a unitary structure and is self-energized and thus is one characterized during inspection operations by extreme freedom of movement unhindered and uninhibited by an associated generally stationary indicating unit.

Figure 2:
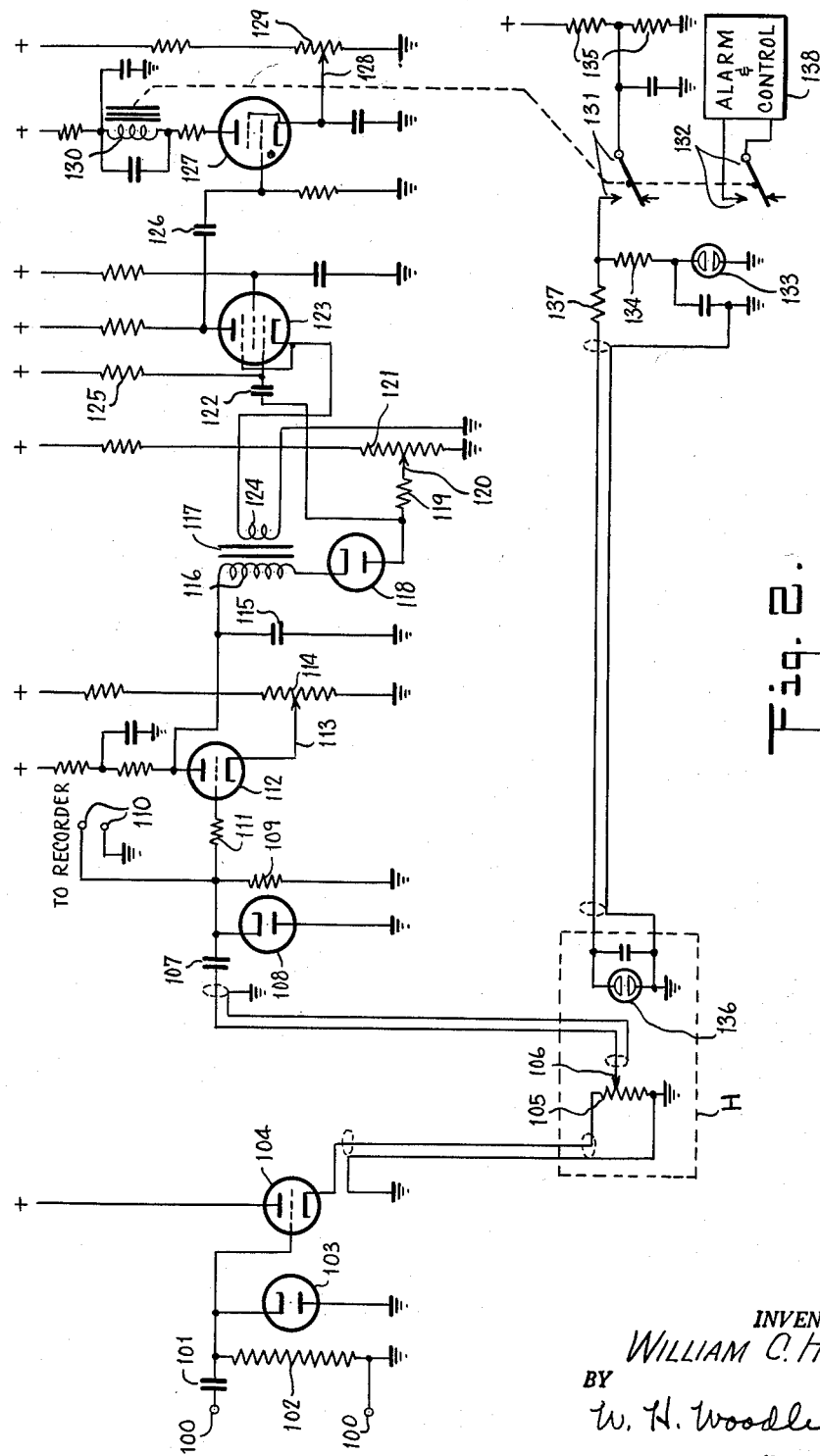

Other objects and advantages of the invention will appear as the detailed description thereof proceeds in the light of the drawings forming a part of this application and in which:

FIGS. 1a and 1b represent a complete seam depth indicator, partly schematic, embodying the present invention in a particular form; and FIG. 2 shows the electrical circuit arrangement of an indicator unit particularly suitable for use in the seam depth indicator of the invention.

A seam depth indicator embodying the present invention includes a small, compact and light-weight inspection unit which is self-contained as a unitary structure and is self-energized. This inspection unit utilizes transistor oscillators, transistor amplifiers, and crystal diodes throughout and all of its components including its self-energizing electrical batteries may be constructed as a unitary assembly requiring only a few cubic inches total volume. The electrical circuit arrangement of the inspection unit is shown in FIG. 1a, and it will be seen that it has no electrical connections to any outside equipment; rather, this unit transmits the results of its inspections as a frequency modulated carrier wave to an associated generally stationary indicating unit shown in FIG. 1b.

Considering now in more detail the inspection unit shown in FIG. 1a, it includes an inductor 10 which may be constructed as described in the aforementioned patents. The inductor 10 is mounted in a supporting structure indicated generally at 11 for movement in spaced relation over the surface 12 of a metallic body to be inspected. One terminal of the inductor 10 is coupled through a phasing resistor 13 to the collector electrode 14 of a PNP type of transistor 15, while the other terminal of the inductor 10 is coupled through series condensers 16 and 17 to the emitter electrode 18 of the transistor. The juncture of the condenser 16 and 17 is connected to ground as shown, and the emitter electrode 18 is connected to ground through a bias resistor 19 of adjustable value. The inductor 10 is tuned to a relatively low frequency, of approximately 8 to 12 kilocycles per second, by a fixed condenser 20 and an adjustable trimmer condenser 21 connected in parallel with each other and between the collector electrode 14 and emitter electrode 18 of the transistor 15. An energizing battery 22, having a grounded positive terminal, is connected through a manually operable switch 23 to the juncture of the inductor 10 and condenser 16 and is coupled through a resistor 24 of relatively large ohmic value to the base electrode 25 of the transistor 15, thus to place operating potential biases on the several electrodes of the transistor 15. A filter capacitor 26 couples the base electrode 25 to ground for purposes presently to be explained.

The arrangement of the components just described provides a low-frequency oscillator having a frequency of oscillation of eight to twelve kilocycles established by resonance of the inductor 10 and the condensers 20 and 21, of which the latter is adjustable to adjust the operating frequency to a desired value. The adjustable resistor 19 provides a convenient adjustment for selecting the optimum bias of the emitter 18 to assure stable oscillations of relatively good sinusoidal wave form.

The generated oscillations are coupled through a condenser 29 to the base electrode 30 of a transistor 31 having an emitter electrode 32 connected to ground through a bias resistor 33. The collector electrode 34 of the transistor 31 is connected through the switch 23 to the negative terminal of the battery 22, and a bias resistor 35 is connected between the collector electrode 34 and base electrode 30 to provide a conventional form of buffer amplifier. The output of the amplifier is developed across the resistor 33, and is applied to a voltage doubling rectifier system having a series condenser 36 charged by a shunt-connected crystal diode rectifier 37 and having a series connected crystal diode rectifier 38 which charges a shunt-connected condenser 39. A potentiometer 40 is connected across the condenser 39, and the movable tap 41 of the potentiometer is connected to the base electrode 25 of the transistor 15. It will be noted that the buffer amplifier has a relatively high input impedance and, therefore, places little load on the transistor low frequency oscillator. The output of the buffer amplifier has a relatively low impedance, so that it is capable of efficiently driving the crystal diode rectifier system last described and thus effectively isolates the oscillator from the rectifier system.

Before proceding further with the description of the invention, it will be helpful to understand the operation of the oscillator arrangement just described. The resistor 24 places an initial negative unidirectional bias of large value on the base electrode 25 of the transistor 15 when the switch 23 is first closed. This causes the transistor to draw a relatively large initial current and accordingly tends to render the arrangement strongly oscillatory. As soon as oscillations begin, however, they are amplified by the buffer transistor amplifier 31 and are rectified to develop a positive unidirectional potential across the potentiometer 40. A portion of this unidirectional potential, as determined by the setting of the potentiometer tap 41, is applied as a positive bias to the base electrode 25 of the transistor 15 to reduce the negative bias applied to the base electrode through the resistor 24. This positive feed-back unidirectional potential increases as the amplitude of the generated oscillations increases and in doing so reduces the collector current of the transistor 15. The amplitude of the generated oscillations is correspondingly reduced until an equilibrium condition is reached after which the steady-state amplitude of oscillation is maintained quite constant by the feed-back unidirectional positive bias applied to the base electrode 25. The point of equilibrium providing the best operational characteristics of the oscillator is readily established by adjustment of the position of the tap 41 on the potentiometer 40. It will be apparent that the unidirectional feed-back amplitude control loop including the buffer amplifier and rectifier system makes the steady-state operating characteristics of the oscillator highly stable, free from drift and immune to outside effects.

The frequency of the generated oscillations is established by the resonant frequency of the inductor 10 and parallel connected condensers 20 and 21. The generated oscillations energize the inductor 10 to cause the latter to produce an electromagnetic field which penetrates the surface 12 of the metallic body to be inspected. This electromagnetic field produces in the metallic body eddy-current electrical losses. These losses, being resistive, absorb power from the oscillator and reduce the amplitude of the generated oscillations. The resistor 13 shifts the phase of the oscillatory voltage applied to the electrodes of the transistor 15 a sufficient amount that it is only the eddy-current losses of the metallic body which influence the amplitude of oscillation. Thus the search inductor 10 may be moved toward and away from the surface of the metallic body 12 without causing the amplitude of oscillation to change significantly, thereby avoiding false defect indications.

Now as the inspection or exploring inductor 10 moves at normal velocity (of approximately 90 surface feet per minute) over a seam or crack in the surface 12 of the body, the electrical eddy-current losses produced in the body are reduced so that the oscillator becomes less heavily loaded and its amplitude of oscillation is temporarily increased in transient manner. The magnitude of this transient amplitude increase is greater in proportion to the depth of the seam, so that it directly indicates the significant character of the seam flaw. The transient oscillation amplitude change is amplified by the transistor buffer 31 and develops a positive potential pulse across the resistor 40. The capacitance of the condenser 26 is sufficiently large, however, that the transient potential pulse last mentioned is by-passed by the latter and accordingly is unable to exert any significant control over the transient change of oscillation amplitude caused by the seam or crack detected. On the other hand, other surface variables of the metallic body 12 such as changes in hardness, cold work, scale thickness, surface texture and the like tend to cause much slower changes of oscillation amplitude of the oscillator and thus are neutralized or cancelled by the positive unidirectional feed-back potential applied from the potentiometer 40 to the base electrode 25 of the transistor 15.

The seam depth indicator also includes a carrier wave oscillator having an inductor 45 tuned to a desired carrier wave frequency by an adjustable condenser 46 and coupled through a condenser 47 between the base electrode 48 and emitter electrode 49 of a transistor 50. A regenerative feed-back winding 51, coupled to the inductor 45, is connected between the collector electrode 52 of the transistor 50 and a source of negative potential comprised by the battery 22 in series with a battery 53 and a switch 54 uni-controlled with the switch 23 as indicated by the broken line 55. The base electrode 48 is biased from the unidirectional potential source last mentioned through a resistor 56. The inductors 45 and 51 are wound upon a ferrite core which not only increases the coefficient of coupling of these windings but also serves as an antenna to radiate the generated carrier wave.

The carrier wave oscillations thus generated are applied to a voltage doubling rectifier system which includes a series condenser 57 and shunt connected crystal diode rectifier 58 and a series crystal diode rectifier 59 and shunt connected condenser 60 as shown. This rectifier system develops across the condenser 60 a unidirectional positive potential which is applied as an operating bias potential between the collector electrode 61 and emitter electrode 62 of an NPN type of transistor 63. The unidirectional potential developed across the condenser 60 is also applied through a resistor 64 to the base electrode 65 of the transistor 63, and there is also applied to the base electrode through a resistor 66 the positive unidirectional potential developed across the potentiometer 40 from the low frequency oscillator earlier described. The magnitude of the resultant bias potential thus applied to the base electrode 65 of the transistor 63 has a value permitting relatively little current to flow through the collector electrode 61 of this transistor. Under this condition, the crystal diode rectifiers 58 and 59 conduct only a small value of current and the charging and discharging currents flowing through the condenser 57 are correspondingly small. The effect of this is that the condenser 57 is effectively open circuited insofar as the resonant circuit 45, 46 is concerned and accordingly has relatively little effect on the oscillatory frequency of the carrier wave generator.

When, however, a transient positive potential pulse is developed as above described across the potentiometer 40 by reason of a crack or seam detected by the exploring inductor 10 in the metallic body to be inspected, the potential pulse is applied through the resistor 66 to the base electrode 65 of the transistor 63 to cause a corresponding increase in the current of the collector electrode 61. This increases the current through the crystal diode rectifiers 58 and 59 and correspondingly increases the charging and discharging current through the condenser 57. This increased current through the condenser 57 places the latter more effectively in parallel with the resonant circuit 45, 46 thus changing its resonant frequency. The frequency of the generated carrier wave correspondingly changes. The magnitude of this change of frequency varies proportionately to the magnitude of the transient potential pulse developed across the potentiometer 40, so that the generated carrier wave is effectively frequency modulated by the transient pulses generated by the low frequency oscillatory arrangement and indicative of the presence and significant character of seams and cracks occurring in the surface of the metallic body inspected.

This frequency modulated carrier wave is radiated by the ferrite core of the inductor 45 to a frequency modulation receiver shown in FIG. 1b. The receiver includes a radio frequency amplifier 70 coupled to a receiving antenna 71, and an oscillator modulator 72 which receives the amplified carrier wave from the amplifier 70 and develops a frequency modulated intermediate frequency carrier wave for amplification by an intermediate frequency amplifier 73 and amplitude limiting by tandem arranged limiting stages 74 and 75. The amplitude limited frequency modulated carrier wave translated by the limiting stage 75 is applied to a frequency modulation detector 76 to derive in the output circuit of the latter the frequency modulation components which comprise the transient pulses generated across the potentiometer 40 of FIG. 1a and indicative of the presence and depth of detected seams or flaws in the surface of the metallic body inspected. These derived pulses are applied through a condenser 77 to a crystal diode rectifier 78 having a potentiometer 79 connected across it. The condenser 77 and rectifier 78 operate as a so-called clamping arrangement by which there is developed across the potentiometer 79 pulses having only negative polarity. A proportionate part of the latter pulses, as selected by manual adjustment of the potentiometer tap 80, are applied to a pulse amplifier 81 for amplification and are then applied to an indicator 83 hereinafter described in more detail. As indicated in broken lines, a recorder 84 may be coupled to the indicator 83 for purposes of recording the presence and depths of detected seams or flaws in the metallic body inspected.

The limiter stages 74 and 75 are of conventional arrangement and develop output negative bias potentials having values which vary with the amplitude of the intermediate frequency carrier wave applied to each limiter. The negative bias developed by the limiter 75 is applied through an automatic gain control circuit 85 to the oscillator modulator 72 and intermediate frequency amplifier 73 so to control the gains of these units as to minimize amplitude variations of the intermediate frequency carrier wave. The output unidirectional potential of the frequency modulation detector 76 is applied through the contacts 86 and 87 of a manual switch to a conventional reactor tube 88 which so controls the oscillator of the oscillator-modulator 72 as to maintain substantially constant the nominal or mean frequency of the intermediate frequency carrier wave. The switch 87 may be closed to a grounded contact 89 to remove this automatic frequency control action during initial adjustment of the pass bands of the units 72–76. The negative unidirectional output potential developed by the amplitude limiter stage 74 is applied through a potentiometer 90 to the control electrode of a triode form of control tube 91 having a relay winding 92 included in its anode circuit. Whenever the intermediate frequency carrier wave exceeds a selected minimum amplitude, the negative potential bias applied by the potentiometer tap 93 to the control tube 91 normally maintains the latter substantially at anode current cut off thus maintaining the relay winding 92 deenergized. However, should the intermediate frequency carrier wave decrease sufficiently in amplitude as to permit the control tube 91 to energize the relay winding 92, the latter closes relay contacts 94 to remove all pulse potential inputs to the pulse amplifier 81 and closes relay contacts 95 to energize an indicating lamp 96 from a battery 97. The indicating lamp 96 upon becoming illuminated thus provides an indication that the amplitude of the received frequency modulated carrier wave is not sufficiently large as to provide reliable operation of the seam depth indicator.

The circuit arrangement of the indicator 83 of FIG. 1b is shown in FIG. 2. It includes input terminals 100 which are coupled through a series condenser 101 and a shunt resistor 102 to a clamping diode rectifier tube 103 having its electrodes connected across the resistor 102 with such polarity as to provide positive clamping, whereby only positive polarity pulses are applied to the control electrode of a cathode follower tube 104. The cathode load impedance of the tube 104 is comprised by a potentiometer 105 remotely located in a unitary indicator housing structure indicated by the broken line box H placed near the metallic body under inspection so that a visual indication is provided, in a manner presently to be explained, each time a seamlike surface flaw is detected. The cathode follower stage 104 has low output impedance as is well known to enable the potentiometer 105 to be so remotely situated. The potentiometer 105 has an adjustable contact 106 which may be manually adjusted to establish the seam-flaw pulse signal amplitude required to provide the visual indication last mentioned, and thus indicate only seam defects greater than a preselected depth. The potentiometer tap 106 is coupled through a condenser 107 to a diode rectifier tube 108 having its electrodes connected with such polarity as to provide positive pulse clamping whereby only positive polarity pulses are developed across a shunt resistor 109 and are applied to output terminals 110 which may be connected to a seam flaw recorder if used.

The positive polarity pulses developed across the resistor 109 are also applied through a series resistor 111 to an amplifier tube 112 having its cathode connected to the tap 113 of a bias potentiometer 114 by which to establish a preselected no-signal value of potential (which may have a value of the order of 134 volts) at the anode of the tube 112. This steady state value of anode potential is stabilized by a shunt connected condenser 115. The anode of the tube 112 is connected through the secondary winding 116 of a transformer 117, a diode rectifier tube 118 having the electrode polarity shown, and an isolating resistor 119 to the tap 120 of a bias potentiometer 121. Under no-signal conditions, the diode 118 will act as an open circuit since its anode potential is established by suitable adjustment of the tap 120 at a lower value than its cathode potential which is at the potential of the anode of the tube 112. However, when a positive polarity pulse is applied to the control electrode of the tube 112, the anode potential of the latter will drop to a value less than the anode potential of the diode 118 so that the latter will now be rendered conductive and the negative pulse potential thus developed across the isolating resistor 119 will be coupled through a condenser 122 to the control electrode of a pentode type of tube 123.

The cathode electrode of the tube 123 is connected to ground through the primary winding 124 of the transformer 117, and the control electrode of the tube 123 is coupled through a resistor 125 to a source of positive potential so that the control electrode is normally maintained during no-signal conditions at a slight positive potential with respect to the cathode of the tube 123. Thus the tube 123 is normally heavily conductive until a negative polarity potential pulse is applied through the condenser 122 to its control electrode to reduce the conductivity of the tube 123. This reduced conductance of the tube 123 induces in the secondary winding 116 of the transformer 117 a voltage which is so phased as to reduce further the potential of the cathode of the tube 118 to render the latter even more conductive. This increased conductivity of the tube 118 increases the amplitude of the negative polarity pulse applied through the condenser 122 to the control electrode of the tube 123 further to reduce the conductivity of the latter. This action is cumulative and rapidly drives the tube 123 to anode-current cut off, the anode potential of the tube 123 rising steeply to maximum peak value. When the tube 123 is ultimately thus rendered non-conductive, the induced potential in the secondary winding 116 of the transformer 117 disappears to render the diode 118 less conductive and thus reduce the potential applied to the control electrode of the tube 123 so that the latter again begins to conduct. This conductivity again induces a potential in the secondary winding 116 of the transformer 117 having such polarity as to render the diode 118 even less conductive so that the magnitude of the negative potential applied to the control electrode of the tube 123 is further reduced and this tube becomes even more fully conductive. This action is again cumulative until the tube 123 is fully conductive. This repetitive cycle by which the tube 123 is alternately rendered non-conductive and conductive continues so long as a positive potential pulse is applied to the control electrode of the tube 112.

The pulsing anode potential thus developed at the anode electrode of the tube 123 is coupled through a condenser 126 to the control electrode of a gaseous discharge type of tube 127 having its cathode biased by adjustment of a tap 128 on a bias potentiometer 129 and including a relay winding 130 in its anode circuit. The tube 127 is normally biased to anode-current cut off by adjustment of the tap 128 on the potentiometer 129 so that no current flows through the relay winding 130. Under this condition, contacts 131 and 132 operated by the relay winding 130 are open circuited. Now when positive potential pulses are applied from the tube 123 to the control electrode of the tube 127, the latter conducts heavily to energize the relay winding 130 and effect closure of the relay contacts 131 and 132. The relay contacts 131 energize a defect indicating lamp 133 of the neon type through a resistor 134 from a potential divider 135 connected to a suitable source of energizing potential. The relay contacts 131 also energize a defect indicating indicator lamp 136, located in the remote indicating unit housing H, from the potential source 135 and through a resistor 137. The relay contacts 132 may energize a suitable audible alarm 138 if desired, or may energize desired auxiliary controls provided in the latter unit.

It will be apparent from the foregoing description of the invention that a seam-depth indicator embodying the invention provides exceptional ease and flexibility of operational application to the detection of seam-like flaws in the surface of metallic bodies, particularly in that the inspection unit of the indicator is of small and quite compact physical size with no external electrical connections and thus readily permits inspections in confined spaces or under other like difficult inspection conditions. The inspection unit has in fact such extreme unhindered freedom of movement as readily to permit its free rotational travel around the exterior surface of a metallic body of rod or pipe configuration or even around the interior surface of pipe. At the same time, the seam-depth indicator possesses high operational reliability and accuracy in the indications provided and may be calibrated in a simple and reliable manner with retention of its calibrated accuracy over prolonged periods of operation.

While a specific form of invention has been described for purposes of illustration, it is contemplated that numerous changes may be made without departing from the spirit of the invention.

What is claimed is:

1. A seam depth indicator comprising a movable structure including an oscillatory system having a resonant circuit establishing the frequency of oscillation thereof, means included in said system for establishing long-term steady-state oscillation amplitude stabilization thereof while permitting short-term oscillation amplitude instability thereof, an exploring inductor included in said resonant circuit for producing an oscillatory magnetic field external to said system and movable with said structure over the surface of a metallic body to develop by reason of eddy-current losses produced in said body by said field an oscillatory-system transient oscillation amplitude variation indicative of the presence of a seam-like flaw in the vicinity of the surface of said body, means carried by said structure and controlled by said oscillatory system for generating and transmitting an electromagnetic carrier wave frequency modulated according to each said transient oscillation amplitude variation, and stationary means for receiving said modulated carrier wave and for deriving and utilizing the modulation component thereof to indicate the presence of said seam-like flaws in said body.

2. A seam depth indicator comprising a movable structure including an oscillatory system having a resonant circuit establishing the frequency of oscillation thereof, means included in said system for establishing long-term steady-state oscillation amplitude stabilization thereof while permitting short-term oscillation amplitude instability thereof, an exploring inductor included in said resonant circuit for producing an oscillatory magnetic field external to said system and movable with said structure over the surface of a metallic body to develop by reason of eddy-current losses produced in said body by said field an oscillatory-system transient potential pulse having a peak amplitude indicative of the presence and relative depth of a seam-like flaw in the vicinity of the surface of said body, means carried by said structure and controlled by said potential pulses for generating and transmitting an electromagnetic carrier wave frequency modulated by each said potential pulse, and stationary means for receiving said modulated carrier wave and for deriving and utilizing the modulation component thereof to indicate the presence and relative depths of said seam-like flaws in said body.

3. A seam depth indicator comprising a movable structure including an oscillatory system having an energy-storage amplitude-control circuit and a resonant circuit establishing the frequency of oscillation thereof, and an exploring inductor included in said resonant circuit for producing an oscillatory magnetic field external to said system and movable with said structure over the surface of a metallic body to develop by reason of eddy-current losses produced in said body by said field an oscillatory system transient oscillation amplitude variation indicative of the presence of a seam-like flaw in the vicinity of the surface of said body, means included in said system and responsive to the amplitude of generated oscillations for developing and applying to said amplitude control circuit a long-term steady-state oscillation amplitude stabilization control potential and for developing a potential pulse corresponding to each said transient oscillation amplitude variation, means carried by said structure and controlled by said potential pulses for generating and transmitting an electromagnetic carrier wave frequency modulated by each said potential pulse, at least one source of energization carried by said structure for energizing said oscillatory system and said last-named means, and stationary means for receiving said modulated carrier wave and for deriving and utilizing the modulation component thereof to indicate the presence of said seam-like flaws in said body.

4. A seam depth indicator comprising a movable structure including an audible-frequency oscillator having a resonant circuit establishing the frequency of oscillation thereof, means carried by said structure for establishing long-term steady-state oscillation amplitude stabilization of said oscillator while permitting short-term oscillation amplitude instability thereof, an exploring inductor included in said resonant circuit and means for maintaining said inductor in preselected spaced relation to the surface of a metallic body to be explored, said inductor producing an oscillatory magnetic field external to said oscillator and movable with said structure over said body to develop a change of oscillator loading by reason of eddy-current losses produced in said body by said field and thereby produce an oscillatory-system transient oscillation amplitude variation indicative of the presence of a seam-like flaw in the vicinity of the surface of said body, means carried by said structure and controlled by said oscillatory system for generating and transmitting an electromagnetic carrier wave frequency modulated according to each said transient oscillation amplitude variation, and stationary means for receiving said modulated carrier wave and for deriving and utilizing the modulation component thereof to indicate the presence of said seam-like flaws in said body.

5. A seam depth indicator comprising a movable structure including an audible frequency oscillatory system having a resonant circuit establishing the frequency of oscillation thereof, amplitude stabilizing feed-back means included in said system for establishing long-term steady-state oscillation amplitude stabilization thereof, an exploring inductor included in said resonant circuit for producing an oscillatory magnetic field external to said system and movable with said structure over the surface of a metallic body to develop by reason of eddy-current losses produced in said body by said field an oscillatory-system transient oscillation amplitude variation indicative of the presence of a seam-like flaw in the vicinity of the surface of said body, carrier wave generating means carried by said structure for generating and transmitting an electromagnetic carrier wave, frequency modulator means carried by said structure and controlled by said oscillatory system for frequency modulating the carrier wave generated by said generating means according to each said transient oscillation amplitude variation, and stationary means for receiving said modulated carrier wave and for deriving and utilizing the modulation component thereof to indicate the presence of said seam-like flaws in said body.

6. A seam depth indicator comprising a unitarily movable structure including a substantially-constant-frequency sinusoidal low-frequency oscillator having an oscillation amplitude control circuit, a rectifier system coupled to said oscillator to develop from the oscillations thereof and to apply to said control circuit a steady-state oscillation-amplitude stabilizing potential and additionally to develop a transient output potential pulse in response to each transient variation of oscillation amplitude, said structure further including a carrier-wave generator-radiator and a frequency modulator controlled by each said potential pulse for pulse-frequency-modulating the carrier wave generated and radiated by said generator-radiator, said oscillator having an alternating-magnetic-field producing inductor movable with said structure and in preselected spaced relation over the surface of a metallic body to develop by changes of oscillator loading occasioned by eddy-current losses produced in said body output rectifier-system potential pulses indicative of seam-like flaws in the vicinity of the surface of said body, and a stationary frequency modulation receiver for receiving said radiated carrier wave and for deriving and utilizing the modulation components thereof to indicate the presence of said seam-like flaws in said body.

7. A seam depth indicator comprising a unitarily movable structure including a substantially-constant frequency sinusoidal low-frequency oscillator having an oscillation amplitude control circuit, a rectifier system having an input circuit coupled to said oscillator and an output circuit in which is developed from the input oscillations and applied to said control circuit a steady-state oscillation-amplitude stabilizing unidirectional potential and in which is additionally developed a transient output potential pulse in response to each transient variation of oscillation amplitude, said structure further including a carrier-wave generator-radiator and a frequency modulator controlled by each said potential pulse for pulse-frequency-modulating the carrier wave generated and radiated by said generator-radiator, said oscillator having an alternating-magnetic-field producing inductor movable with said structure and in preselected spaced relation over the surface of a metallic body to develop by changes of oscillator loading occasioned by eddy-current losses produced in said body output rectifier-system potential pulses indicative of seam-like flaws in the vicinity of the surface of said body, and a stationary frequency modulation receiver for receiving said radiated carrier wave and for deriving and utilizing the modulation components thereof to indicate the presence of said seam-like flaws in said body.

8. A seam depth indicator comprising: a unitarily movable structure including a substantially-constant-frequency sinusoidal low-frequency transistor oscillator, a crystal rectifier system, a transistor buffer amplifier for supplying the oscillations of said oscillator to said rectifier system to develop thereby and apply to said oscillator a steady-state amplitude-stabilization potential while additionally developing a transient output potential pulse in response to each transient variation of oscillation amplitude, a transistor carrier-wave generator, a transistor frequency modulator coupling said rectifier system to said generator-radiator to pulse-frequency-modulate the carrier wave generated and radiated thereby, said low frequency oscillator having an alternating-magnetic-field producing inductor movable with said structure in preselected closely spaced relation over the surface of a metallic body to develop by low-frequency oscillator loading a radiated carrier wave frequency modulated by potential pulses indicative of seam-like flaws in the vicinity of the surface of said body; and a stationary frequency-modulation receiver for receiving said radiated carrier wave and for deriving and utilizing the modulation components thereof to indicate the presence of said seam-like flaws in said body.

9. A seam depth indicator comprising: a unitarily movable structure including a substantially-constant-frequency sinusoidal low-frequency transistor oscillator, a voltage-doubling crystal rectifier system, a transistor buffer amplifier for supplying the oscillations of said oscillator to said rectifier system to develop thereby and apply to said oscillator a steady-state amplitude-stabilization potential while additionally developing transient output potential pulse in response to each transient variation of oscillation amplitude, a transistor carrier-wave generator-radiator having a frequency determining resonant circuit, a transistor frequency modulator having a collector electrode coupled to said resonant circuit for energization thereby and having a conductivity control electrode coupled to said rectifier system for control by each said potential pulse to pulse-frequency-modulate the carrier wave generated and radiated by said generator-radiator, said low frequency oscillator having an alternating-magnetic-field producing inductor movable with said structure in preselected closely spaced relation over the surface of a metallic body to develop by low-frequency oscillator loading a radiated carrier wave frequency modulated by potential pulses indicative of seam-like flaws in the vicinity of the surface of said body; and a stationary frequency-modulation receiver for receiving said radiated carrier wave and for deriving and utilizing the modulation components thereof to indicate the presence of said seam-like flaws in said body.

10. A seam depth indicator comprising: a unitarily movable structure including a substantially-constant-frequency sinusoidal low-frequency transistor oscillator, a voltage doubling crystal rectifier system, a common-emitter transistor buffer amplifier for supplying the oscillations of said oscillator to said rectifier system to develop thereby and apply to said oscillator a steady-state amplitude-stabilization potential while additionally developing a transient output potential pulse in response to each transient variation of oscillation amplitude, a transistor carrier-wave generator-radiator, a common-emitter transistor frequency modulator having a collector electrode energized by a rectifier system capacitively coupled to control the carrier wave frequency of said generator-radiator and having a value of emitter current controlled by each said potential pulse to pulse-frequency-modulate the carrier wave generated and radiated by said generator-radiator, said low frequency oscillator having an alternating-magnetic-field producing inductor movable with said structure in preselected closely spaced relation over the surface of a metallic body to develop by low-frequency oscillator loading a radiated carrier wave frequency modulated by potential pulses indicative of seam-like flaws in the vicinity of the surface of said body; and a stationary frequency-modulation receiver for receiving said radiated carrier wave and for deriving and utilizing the modulation components thereof to indicate the presence of said seam-like flaws in said body.

References Cited in the file of this patent

UNITED STATES PATENTS

| | | |
|---|---|---|
| 2,564,928 | Schmidt | Aug. 21, 1951 |
| 2,580,670 | Gilbert | Jan. 1, 1952 |
| 2,660,704 | Harmon et al. | Nov. 24, 1953 |
| 2,768,368 | Crane et al. | Oct. 23, 1956 |
| 2,907,991 | Van Allen | Oct. 6, 1959 |

OTHER REFERENCES

"Radio Pill Broadcasts from Stomach," page 114 of Radio and TV News, June 1957.